United States Patent
Celi, Jr. et al.

(10) Patent No.: US 6,631,350 B1
(45) Date of Patent: Oct. 7, 2003

(54) DEVICE-INDEPENDENT SPEECH AUDIO SYSTEM FOR LINKING A SPEECH DRIVEN APPLICATION TO SPECIFIC AUDIO INPUT AND OUTPUT DEVICES

(75) Inventors: Joseph Celi, Jr., Boca Raton, FL (US); Brett Gavagni, Sunrise, FL (US); Leo Leontiades, Boca Raton, FL (US); Bruce D. Lucas, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 09/649,189

(22) Filed: Aug. 28, 2000

(51) Int. Cl.[7] .............................................. G10L 21/06
(52) U.S. Cl. ....................... 704/270; 704/275; 704/260; 704/270.1
(58) Field of Search ................................ 704/270, 275; 379/88.1; 434/185

(56) References Cited

U.S. PATENT DOCUMENTS

| | | | | |
|---|---|---|---|---|
| 6,151,576 A | * | 11/2000 | Warnock et al. | ............ 704/260 |
| 6,269,336 B1 | * | 7/2001 | Ladd et al. | ................. 704/270 |
| 6,296,489 B1 | * | 10/2001 | Blass et al. | ................. 434/185 |
| 6,385,583 B1 | * | 5/2002 | Ladd et al. | ................. 704/270 |
| 6,466,654 B1 | * | 10/2002 | Cooper et al. | ........... 379/88.01 |
| 6,470,317 B1 | * | 10/2002 | Ladd et al. | ................. 704/275 |
| 6,493,671 B1 | * | 12/2002 | Ladd et al. | ................. 704/270 |
| 6,493,673 B1 | * | 12/2002 | Ladd et al. | ................. 704/275 |

OTHER PUBLICATIONS

Sun Microsystems, Inc., *Java™ Media Framework API Gude*, Nov. 1999, at 11–42.
Sun Microsystems, Inc., *Java Media Framework Specification*, Class Hierarchy, Nov. 1999, at 1–6.

* cited by examiner

Primary Examiner—Susan McFadden
(74) Attorney, Agent, or Firm—Akerman Senterfitt

(57) ABSTRACT

A device-independent speech audio system for linking a speech driven application to specific audio input and output devices can include a media framework for transporting digitized speech audio between speech driven applications and a plurality of audio input and output devices. The media framework can include selectable device-dependent parameters which can enable the transportation of the digitized speech to and from the plurality of audio input and output devices. The device-independent speech audio system also can include an audio abstractor configurable to provide specific ones of the selectable device-dependent parameters according to the specific audio input and output devices. Hence, the audio abstractor can provide a device-independent interface to the speech driven application for linking the speech driven application to the specific audio input and output devices.

23 Claims, 2 Drawing Sheets

DEVICE-INDEPENDENT SPEECH AUDIO SYSTEM FOR LINKING A SPEECH DRIVEN APPLICATION TO SPECIFIC AUDIO INPUT AND OUTPUT DEVICES

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech enabled computing and more particularly to a device-independent system, method and apparatus for linking a speech driven application to specific audio input and output devices.

2. Description of the Related Art

Speech driven applications differ from traditional GUI based applications in that speech driven applications handle audio data for both input and output. Typically, GUI based applications rely on an input device, such as a mouse or keyboard, for input and on a visual display, such as a monitor, for output. In contrast, speech driven applications rely on an audio input device, such as a microphone, for input and on an audio output device, such as speakers, for output. Typically, audio input data received from the audio input device can be provided via audio circuitry to a speech recognition engine for conversion to computer recognizable text. Similarly, computer recognizable text originating in the speech driven application can be provided to a text-to-speech engine for conversion to audio output data to be provided via audio circuitry to the audio output device.

Presently, speech driven applications require audio input data received from an audio input device to be in a media format suitable for use with a corresponding speech recognition engine. Likewise, speech driven applications require audio output data generated by a text-to-speech engine and provided to an audio output device to be in a media format specific to the audio output device. Yet, audio input and output devices can vary from transducer-type devices such as microphones and speakers to specialized audio circuitry and systems to distributed audio input and output devices remotely positioned across a network. Hence, speech driven application developers have been compelled to handle the receipt and transmission of audio data from and to varying audio input and output sources and corresponding media transport protocols on a case-by-case basis. As a result, substantial complexity necessarily is added to the speech driven application.

There have been several attempts to transport audio data to and from speech driven applications in a manner which frees the speech application developer from varying audio data transmission and receipt methods according to specific audio data input and output sources. Some examples include the multimedia API layer of the Microsoft Windows® operating system and the multimedia presentation manager of the IBM OS/2® operating system. However, both examples require highly complex interactions on behalf of the speech application developer and neither permits a simple audio data stream-in/stream-out approach to the transmission and receipt of audio data from varying data sources. In addition, both examples are compiled solutions which are platform specific to a particular hardware configuration and a specific operating system.

The Java™ Media Framework (JMF™) represents one attempt to transport audio data to and from a speech driven application in a hardware and operating system neutral device. JMF is fully documented in the *Java Media Framework API Guide* (JMF API Guide) published by Sun Microsystems, Inc. of Mountain View, Calif. on Nov. 19, 1999 (incorporated herein by reference) and the *Java Media Framework Specification* (JMF Specification) also published by Sun Microsystems, Inc. on Nov. 23, 1999 (incorporated herein by reference). As will be apparent from both the JMF API Guide and the JMF Specification, although unlike previous operating system dependent solutions, JMF is a Java-based platform independent solution, the use of JMF to provide audio data to and from a speech driven application remains a daunting task. In particular, JMF requires the speech driven application developer to specify several device-dependent parameters, for example media transport protocol, and media transport specific parameters, for example frame size and packet delay. Hence, a speech application developer using JMF must maintain an awareness of the device characteristics for the audio input and output sources.

For example, audio data transmitted in a European telephony network typically is A-law encoded. In contrast, audio data transmitted over a U.S. telephony network typically is $\mu$-law encoded. As a result, in order for a JMF-based speech driven application to handle audio data transmitted over a European telephony network, proper settings consonant with the A-law encoding of audio data must be known by the speech driven application developer and specifically applied to the speech driven application in addition to other settings such as transport protocol and packet delay. Thus, what is needed is a device-independent system, method and apparatus for linking a speech driven application to specific audio input and output devices.

SUMMARY OF THE INVENTION

The present invention is an audio abstractor that provides a device independent approach to enable a speech driven application to receive and transmit digitized speech audio to and from audio input and output devices. In particular, the audio abstractor can provide a device-independent interface to speech driven applications through which the speech driven applications can access digitized speech audio from specific audio input and output devices without having to specify device-specific parameters necessary to interact with those specific audio input and output devices. Rather, the audio abstractor can be configured to interact with specific audio input and output devices, for example through a media framework, thereby off-loading from the speech driven application the complexity of audio device configuration.

A device-independent speech audio system for transparently linking a speech driven application to specific audio input and output devices can include a media framework for transporting digitized speech audio between speech driven applications and a plurality of audio input and output devices. The media framework can include selectable device-dependent parameters which can enable the transportation of the digitized speech to and from the plurality of audio input and output devices. The device-independent speech audio system also can include an audio abstractor configurable to provide specific ones of the selectable device-dependent parameters according to the specific audio input and output devices. Hence, the audio abstractor can provide a device-independent interface to the speech driven application for linking the speech driven application to the specific audio input and output devices.

In a representative embodiment of the present invention, the device-independent speech audio system can be used in conjunction with a speech recognition system. Accordingly, the device-independent speech audio system can further include a speech recognition engine communicatively linked to the device-independent interface of the audio abstractor. In consequence, the speech recognition engine can receive the digitized speech audio from a specific audio input device via the audio abstractor without specifying the specific ones of the device-dependent parameters. Also, the speech recognition engine can convert the received digitized speech audio to computer readable text. Finally, the speech recognition engine can provide the converted computer readable text to the speech driven application.

In another representative embodiment of the present invention, the device-independent speech audio system can be used in conjunction with a text-to-speech (TTS) engine. Accordingly, the device-independent speech audio system can further include a text-to-speech (TTS) engine communicatively linked to the device-independent interface of the audio abstractor. The TTS engine can convert computer readable text received from the speech driven application into the digitized speech audio. In consequence, the TTS engine can transmit the digitized speech audio to a specific audio output device via the audio abstractor without specifying the specific ones of the device-dependent parameters.

Notably, the interface of the present invention can include a device-independent method for opening a buffer for receiving the digitized speech audio from a specific audio input source. Similarly, the interface can include a device-independent method for opening a buffer for transmitting the digitized speech audio to a specific audio output source.

The device-dependent parameters can include an encoding type parameter. Furthermore, the device-dependent parameters can include sample rate; sample size; and, channels. Moreover, the device-dependent parameters can include byte order; and, signed/unsigned format. Finally, the device-dependent parameters can include frame size; frame rate; and, data type. Notably, in one embodiment of the invention, the media framework can be the Java Media Framework (JMF).

In a representative embodiment of the present invention, the specific audio input and output devices can be remotely positioned from the speech driven application in a computer communications network. As such, the speech driven application can be employed in an IVR system in a node in a computer communications network. Where the specific audio input and output devices are remotely positioned from the speech driven application in a computer communications network, the specific audio input and output devices can be configured to place and receive telephone calls. In that regard, the telephone calls can be converted to digitized speech audio through a telephony interface to the computer communications network.

The present invention also can include a method for linking a speech driven application to specific audio input and output devices. Specifically, the method can include configuring an input buffer to receive digitized speech audio from a specific audio input device; configuring an output buffer to transmit digitized speech audio to a specific audio output device; providing device-independent methods for accessing the buffers; and, transporting digitized speech audio between the speech driven application and the specific audio input and output devices through the buffers via the device-independent methods. Notably, the speech driven application need not specify device-dependent parameters necessary to transport the digitized speech audio between the audio input and output sources. In a representative embodiment of the method of the invention, the step of configuring can include selecting in the device-independent methods at least one method in a media framework for configuring the buffers according to device-dependent parameters necessary to transport the digitized speech audio between the specific audio input and output devices.

In a representative embodiment of the present invention, the device-independent speech audio system can be used in conjunction with a speech recognition system. Accordingly, the method of the invention also can include communicatively linking a speech recognition engine to the input buffer; transporting the digitized speech audio from the specific audio input device to the speech recognition engine through the input buffer without specifying the device-dependent parameters; converting the digitized speech audio to text in the speech recognition engine and providing the converted text to the speech driven application.

In another representative embodiment of the present invention, the device-independent speech audio system can be used in conjunction with a text-to-speech (TTS) engine. Accordingly, the method of the invention can further comprise communicatively linking a text-to-speech (TTS) engine to the output buffer; converting computer readable text in the speech driven application to the digitized speech audio in the TTS engine; and, transporting the digitized speech audio from the TTS engine to the specific audio output device through the output buffer without specifying the device-dependent parameters.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention solves the problem of device independent audio abstraction by providing a system, method and apparatus for linking a speech driven application to specific audio input and output devices. Specifically, the invention can permit the speech driven application to transmit and receive speech audio data through an audio abstractor without requiring the speech driven application to specify device-dependent parameters necessary to communicate with specific audio input and output devices. Rather, a speech driven application utilizing the audio abstractor of the present invention can access an exposed method of the audio abstractor for creating a buffer through which the speech driven application can receive speech audio data. Correspondingly, a speech driven application utilizing the audio abstractor of the present invention can access an exposed method of the audio abstractor for creating a buffer through which the speech driven application can transmit speech audio data. In both cases, the speech driven application need not specify such particulars as encoding scheme, sample rates and sizes, frame rates and sizes, channels, and byte order.

Figure 1A:
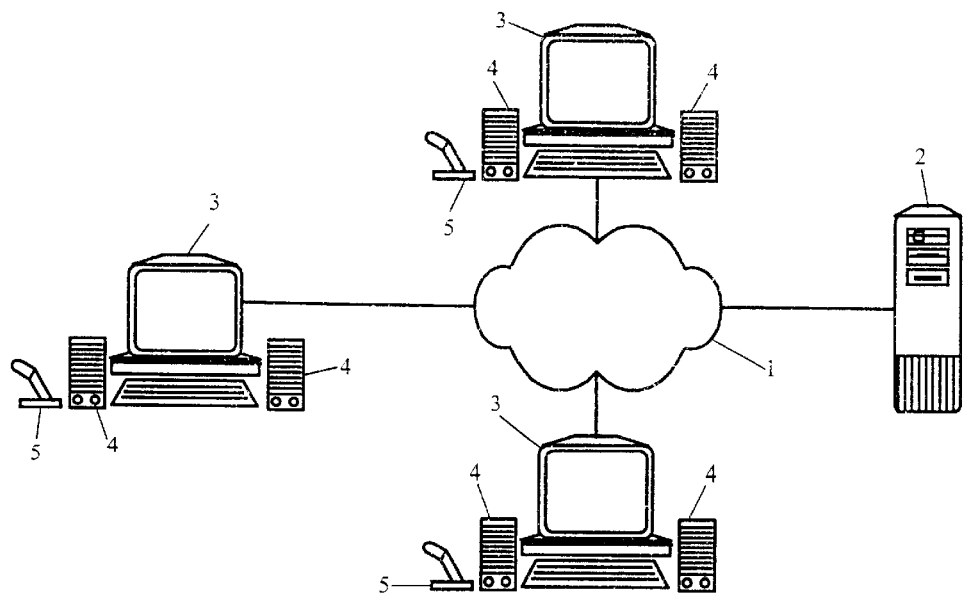
FIGS. 1A and 1B are pictorial representations of exemplary network topologies in which the system and method of the invention can be practiced.
Figure 1B:
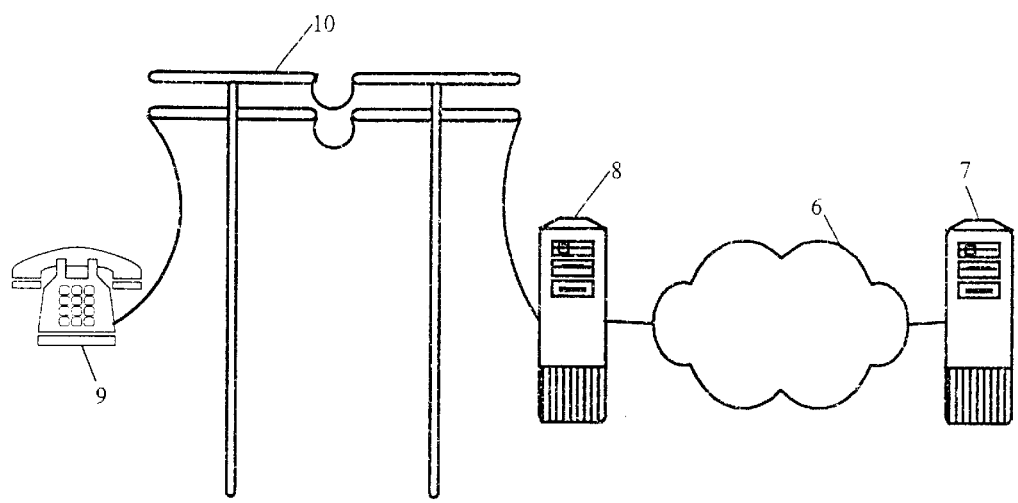

FIGS. 1A and 1B are pictorial illustrations of various network topologies in which a device-independent speech audio system of the present invention can be implemented. FIG. 1A depicts the simpler case in which a plurality of computing devices 3 are communicatively connected to a speech server 2 through a network 1. Each computing device 3 can include an audio input device 5 and an audio output device 4. In the topology shown in FIG. 1A, the audio input device 5 is shown to be an external microphone. Similarly, the audio output device 4 is shown to be a pair of external audio speakers. Notwithstanding, the particular topology illustrated in FIG. 1A is not limited in regard to the computing devices 3 shown. Specifically, the computing devices 3 can be any of those computing device which are suitable for receiving and transmitting speech audio. Examples of some suitable computing devices can include speech-enabled embedded systems and speech-enabled wireless handheld devices. Also, the audio input and output devices, 4, 5 are not limited merely to a microphone and speakers. Rather, other suitable audio input and output devices can be substituted in lieu of the microphone and speakers.

The speech server 2 of FIG. 1A can include a computing device suitable for storing and executing the speech driven application, transmitting and receiving speech audio data over the network 1, processing the speech audio data, for example performing speech-to-text conversion and text-to-speech conversion, and transporting speech audio data between the network 1 and the speech driven application. Many computing devices are well-known to have a sufficient configuration for performing the above-noted tasks, including one of the many high-speed multimedia computers manufactured by International Business Machines Corporation of Armonk, N.Y. Notwithstanding, other suitable computing devices can be substituted for the speech server 2 including embedded computing devices and wireless handheld devices.

The transmission of speech audio between a telephone network and a traditional computer communications networks is well-known in the art. In particular, it is known to provide distributed voice applications over a computer communications network which can interface with a packet switched telephone network (PSTN) through a Voice over IP (VoIP) gateway. As such, the present invention can be effective when applied to a VoIP network or other similarly functional network. In particular, FIG. 1B depicts an Interactive Voice Response (IVR) system in which a user can provide speech audio through a telephone device 9 across a telephone network 10 into a computer communications network 6 by way of a telephony gateway 8.

Specifically, as shown in FIG. 1B, a telephony gateway 8 can receive speech audio data from a telephone network 10 and provide the same to a speech server 7 over the network 6. Conversely, the telephony gateway 8 can receive speech audio data from the speech server 7 and can transmit the same over the telephone network 10 to the telephone device 9. Hence, the use of the telephone device 9 can provide the same utility as the audio input and output devices 4, 5 of FIG. 1A.

Figure 2:
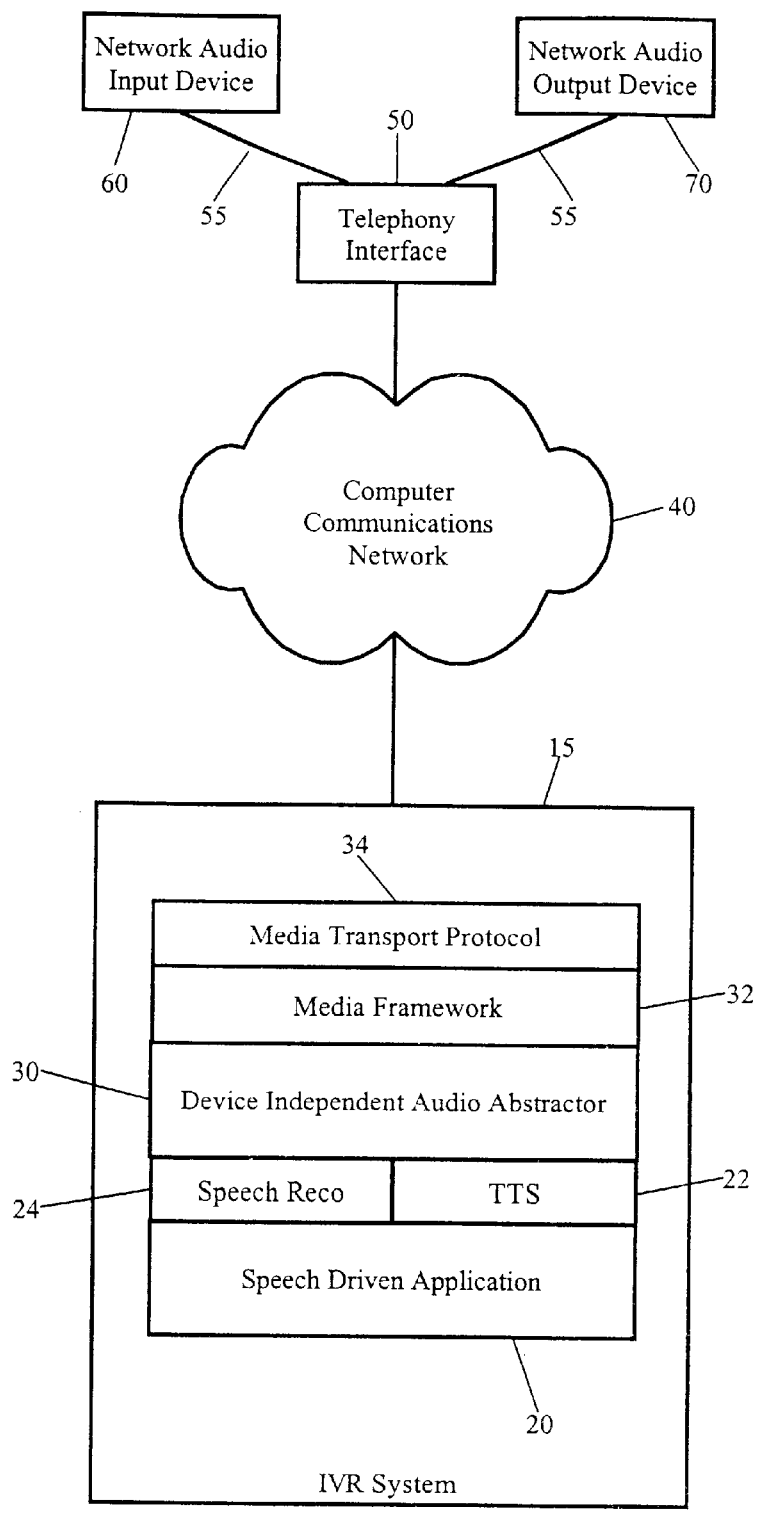
FIG. 2 is a schematic diagram of a device-independent speech audio system in accordance with the inventive arrangements.

FIG. 2 is a schematic diagram of a representative embodiment of the device-independent speech audio system as implemented in an IVR system 15. In the representative embodiment of the present invention, speech audio can be received in an audio input device 60. Correspondingly, speech audio can be audibly provided through an audio output device 70. In the representative embodiment shown in FIG. 2, the audio input device 60 and audio output device 70 can be combined in a telephone handset through which a user can provide speech input to the IVR system 15 and hear spoken responses from the IVR system 15. Notwithstanding, the invention is not limited merely to a telephone handset. Rather, any suitable audio input device through which speech audio can be received, and any suitable audio output device through which speech audio can be provided can suffice for the purposes of the present invention. For example, the use of a microphone and speakers in combination with a personal computer and telephony interface is well known as a substitute for a telephone handset.

In the representative embodiment, the IVR system 15 is an H.323 compliant VoIP client which can establish a communications link between the audio input device 60 through the telephony interface 50 using an H.323 call control interface. Upon establishing a connection, speech audio data can be received from the audio input device 60 and communicated across a PSTN 55 to the telephony interface 50 which can act as a gateway between the PSTN 55 and the computer communications network 40. The telephony interface 50 can digitize, compress and encode the speech audio into digitized speech suitable for transmission over the computer communications network 40. An exemplary telephony interface 50 can include a VoIP gateway server for providing an interface between a PSTN and H.323 compliant VoIP clients. Finally, the telephony interface 50 can transmit the digitized speech over the computer communications network 40 to the IVR system 15.

Correspondingly, speech audio generated in the IVR system 15 can be transmitted across the computer communications network 40 to the telephony server 40. The telephony server 40 can decode, decompress, and reconstruct the digitized speech into an analog speech signal suitable for transmission over the PSTN 55. Subsequently, the telephony server 40 can transmit the analog speech signal over the PSTN to the audio output device 70 through which the user can hear an audio response.

The IVR system 15 of the present invention can include therein a speech driven application 20 in which logic can be performed and responses formulated based upon input received through the computer communications network 40. Specifically, user input in the form of digitized speech received in the IVR system 15 can be converted into computer recognizable text by the speech recognition engine 24. The computer recognizable text subsequently can be provided to the speech driven application 20 as user input. Conversely, responses to the user input formulated by the speech driven application can be converted into digitized speech by the text-to-speech engine 22. Subsequently, the digitized speech can be transmitted over the computer communications network 40, ultimately over the PSTN 55, and finally to the audio output device 70.

In order to transport digitized speech over the computer communications network, a media transport protocol 34 must be employed so that the digitized speech can be uniformly transmitted across a conventional data communications network such as the computer communications network 40 of the present invention. In the present invention, digitized speech can be transmitted across the computer communications network using the well-known Real Time Protocol (RTP) defined in RFC1889 *RTP: A Transport Protocol for Real-Time Applications* published by the Internet Engineering Task Force (IETF) on January 1996. Still, routine communication of audio data using RTP can prove to be a complex task. Accordingly, the IVR system 15 also includes a media framework 32 which can abstract the use of a communications protocol such as RTP in the transmission and receipt of audio data. An example of a media framework suitable for inclusion in the present invention can include JMF.

Still, the use of a media framework, such as JMF, does not relieve one of specifying device-dependent parameters necessary to successfully transmit digitized speech audio over the computer communications network 40 between the speech driven application 20 and the audio input and output devices 60, 70. Thus, the IVR system 15 of the present invention includes a device-independent audio abstractor 30 through which the speech driven application can transmit and receive speech audio without specifying device-dependent parameters necessary to transport the digitized speech audio between specific audio input and output devices such as the audio input and output devices 60, 70. Such parameters can include an encoding type parameter, sample rate, sample size, channels, byte order, signed/unsigned format, frame size, frame rate, and data type.

Appendixes A lists a sample source code segment in the Java programming language for the device-independent audio abstractor 30 of the present invention. From the code segment it will be apparent that a getInputStream( ) method and a setOutputStream( ) method are provided in an AudioCC class which imlements a JMF BufferTransferHandler. The getInputStream( ) method returns to the calling object an instance of RecoStream defined in part in Appendix B. Similarly, the setOutputStream( ) method communicatively links the calling object to an instance of a TTSStream defined in part in Appendix C.

Notably, the AudioCC class represents merely one technique for implementing the audio abstractor 30 of the present invention. In particular, the audio abstractor 30 could easily be implemented using any number of programming languages for distribution across any number of computing platforms. Moreover, the media framework 32 and media transport protocol 34 used for performing the underlying transportation of speech audio is limited neither to JMF nor to RTP. Rather, any suitable media framework and media transport protocol can suffice. In particular, in one representative embodiment of the present invention, a media framework can be formed using only those media transport methods necessary to perform media transmission and receiving of speech audio consonant with the requirements of the IVR system 15.

As shown in Appendix B, the RecoStream object implements a JMF PushBufferStream and provides the device dependent details necessary for establishing a buffer for receiving digitized speech audio from a specific audio input device. In particular, a RecoStream object specifies the device-dependent parameters in the constructor. In the example shown in Appendix B, the device-dependent parameters include 16-bit linear audio to be read over one channel in a buffer wherein each byte in the buffer is a signed value in Little-Endian byte order. Advantageously, in order to configure the RecoStream buffer to receive speech audio data from a different audio input device, a user merely can re-program the device-dependent parameters of the RecoStream constructor without modifying the speech driven application. Hence, a speech driven application can establish a communicative link to the RecoStream buffer without specifying device-dependent parameters merely by accessing the getInputStream( ) method of the audio abstractor 30.

Similar to the getInputStream( ) method, the setOutputStream( ) method associates a TTSStream pointer with a buffer for transmitting digitized speech audio to a specific audio output device. The class TTSStream implements a JMF PushBufferStream and provides the device dependent details necessary for establishing a buffer for transmitting digitized speech audio to a specific audio output device. In particular, a TTSStream object specifies the device-dependent parameters in the constructor. In the example shown in Appendix C, the device-dependent parameters include 16-bit linear audio to be read over one channel in a buffer wherein each byte in the buffer is a signed value in Little-Endian byte order. Like the RecoStream, object, in order to configure the TTSStream buffer to transmit speech audio data to a different audio output device, a user merely can re-program the device-dependent parameters of the TTSStream constructor without modifying the speech driven application. Hence, a speech driven application can establish a communicative link to the TTSStream buffer without specifying device-dependent parameters merely by accessing the setOutputStream( ) method of the audio abstractor 30.

Appendix D illustrates a sample code segment for a speech driven application in which the speech driven application can establish communicative links to buffers for transmitting and receiving digitized speech audio to and from specific audio output and input devices without specifying device-dependent parameters. Specifically, the speech driven application can instantiate the audio abstractor 30 shown in the example as class AudioCC. Once an instance of AudioCC has been created, the exposed methods getInputStream( ) and setOutputStream( ) can be accessed without specifying device-dependent parameters. In consequence, the audio abstractor provides to the speech driven application a device-independent system for transparently linking the speech driven application to specific audio input and output devices

APPENDIX A

```
/************************************************
 *
 *      Device Independent Audio Abstractor
 *
 ************************************************/
import javax.media.protocol.*;
/****************************************************************
 * This class provides a device independent audio abstraction
 * layer for speech driven applications to obtain incoming audio
 * and to provide outgoing audio.
 ****************************************************************/
public class AudioCC implements BufferTransferHandler
{
    private PushBufferStream tts Stream = null;
    private RecoStream recoStream = new RecoStream( );
    private BufferTransferHandler realTransferHandler = null;
    //Constructor
    public Audio( )
    {
    }
    public PushBufferStream getInputStream( )
    {
            return(recoStream);
    }
    public void getOutputStream(Push BufferStream ttss)
    {
            ttsStream = ttss;
            ttsStream.setTransferHandler(this);
    }
    public void setTTSTransferHandler(BufferTransferHandler bth)
    {
            realTransferHandler = bth;
    }
    public void transferData(PushBufferStream stream)
    {
            realTransferHandler.transferData(stream);
    }
}
```

APPENDIX B

```
/*********************************************************************
 * RecoStream
 *
 *********************************************************************/
import javax.media.*;
import javax.media.format.*;
import javax.media.protocol.*;
/*********************************************************************
 * This class implements a JMF 2.0 PushBufferStream that represents audio
 * which is to be directed to the speech reco engine.
 *********************************************************************/
public class RecoStream implements PushBufferStream
{
    private static final int MAX_BUFFER_LEN = 65535;
    protected byte[] data;
    protected AudioFormat audioFormat;
    protected BufferTransferHandler transferHandler = null;
    private byte bAudioData16[] = new byte[MAX_BUFFER_LEN];
    private int iCurLen = 0;
    private long lTimeStamp = 1000;
    private int seqNo = 0;
    public RecoStream( )
    {
        audioFormat = new AudioFormat(  AudioFormat.LINEAR,
                                        8000.0,
                                        16,
                                        AudioFormat.LITTLE_ENDIAN
                                        AudioFormat.SIGNED,
                                        16,
                                        Format.NOT_SPECIFIED,
                                        Format.byteArray);
    } // end of constructor 1
    public synchronized void read(Buffer buffer) throws IOException
    {
        long t1 = System.currentTimeMillis( );
        Object outdata = buffer.getData( );
        if(outdata.getClass( ) != Format.byteArray)
        {
            return;
        }
        int iLength = ((byte[])outdata).length;
        if(iLength < iCurLen)
        {
            return;
        }
        buffer.setFormat(audioFormat);
        buffer.setTimeStamp(lTimeStamp);
        System.arraycopy(   bAudioData16,   // src
                            0,              // src index
                            outdata,        // dst
                            0,              // dst index
                            iCurLen);       // number of bytes to copy
        buffer.setSequenceNumber(seqNo++);
        buffer.setLength(iCurLen);
        buffer.setFlags(0);
        buffer.setHeader(null);
        lTimeStamp += 60;
        iCurLen = 0;
    }
                                    . . .
    public void setTransferHandler(BufferTransferHandler transferHandlerIn)
    {
        transferHandler = transferHandlerIn;
    }
} // end of class RecoStream
```

APPENDIX C

```
import java.io*;
import java.util.*;
import java.awt.Dimension;
import java.media*;
import javax.media.format.*;
import javax.media.protocol.*;
import java.io.IOException;
```

APPENDIX C-continued

```
public class SampleInputStream implements PushBufferStream, Runnable
{
    protected AudioFormat audioFormat;
    protected BufferTransferHandler transferHandler = null;
    private static int SAMPLE_BYTES = 778;
    private static int MAX_FILE_SIZE = 100000;
    private byte[] bAudioClip = new byte[MAX_FILE_SIZE];
```

APPENDIX C-continued

```
private long ITimeStamp = 1000;
private int seqNo = 0;
private boolean fContinue = true;
private int iFileSize = 0;
private int iCurIndex = 0;
private int iSleepTime = SAMPLE_BYTES/16;
private Random rand = new Random(System.currentTimeMillis( ));
public TTSStream( )
{
  audioFormat = new AudioFormat(  AudioFormat.LINEAR,
                                  8000.0,
                                  16,
                                  AudioFormat.LITTLE_ENDIAN,
                                  AudioFormat.SIGNED,
                                  16,
                                  Format.NOT_SPECIFIED,
                                  Format.byteArray);
} // end of constructor 1
  . . .
public void setTransferHandler(BufferTransferHandler transferHandlerIn)
{
  transferHandler = transferHandlerIn;
}
} // end of class SampleInputStream
```

APPENDIX D

```
import javax.media.*;
import javax.media.protocol.*;
import javax.media.format.*;
class SpeechDrivenApplication implements BufferTransferHandler
{
    //
    // Device Independent Audio Abstractor
    //
    AudioCC cc = new AudioCC( );
    TTSStream tts = new TTSstream( );
    private long tLast = 0;
    SpeechDrivenApplication( )
    {
        PushBufterStream recoStream = cc.getInputStream( );
        recoStream.setTransferHandler(this);
        cc.setOutputStream(tts);
    }
       . . .
    public static void main(String[ ] args)
    {
        new SpeechDrivenApplication(args[0]);
    }
} // end of SpeechDrivenApplication class
```

What is claimed is:

1. A device-independent speech audio system for linking a speech driven application to specific audio input and output devices comprising:

a media framework for transporting digitized speech audio between speech driven applications and a plurality of audio input and output devices, said media framework comprising selectable device-dependent parameters for enabling said transportation of said digitized speech to and from said plurality of audio input and output devices; and, an audio abstractor configurable to provide specific ones of said selectable device-dependent parameters according to the specific audio input and output devices;

said audio abstractor providing a device-independent interface to the speech driven application for linking the speech driven application to the specific audio input and output devices.

2. The system of claim 1, further comprising:

a speech recognition engine communicatively linked to said device-independent interface of said audio abstractor;

said speech recognition engine receiving said digitized speech audio from a specific audio input device via said audio abstractor without specifying said specific ones of said device-dependent parameters;

said speech recognition engine converting said received digitized speech audio to computer readable text and providing said converted computer readable text to the speech driven application.

3. The system of claim 1, further comprising:

a text-to-speech (TTS) engine communicatively linked to said device-independent interface of said audio abstractor;

said TTS engine transmitting said digitized speech audio to a specific audio output device via said audio abstractor without specifying said specific ones of said device-dependent parameters;

said TTS engine converting computer readable text received from the speech driven application into said digitized speech audio.

4. The system of claim 1, wherein said interface comprises:

a device-independent method for opening a buffer for receiving said digitized speech audio from a specific audio input source.

5. The system of claim 1, wherein said interface comprises:

a device-independent method for opening a buffer for transmitting said digitized speech audio to a specific audio output source.

6. The system of claim 5, wherein said interface further comprises:

a device-independent method for opening a buffer for receiving said digitized speech audio from a specific audio input source.

7. The system of claim 1, wherein said device-dependent parameters comprise:

encoding type.

8. The system of claim 7, wherein said device-dependent parameters further comprise:

sample rate;

sample size; and, channels.

9. The system of claim 8, wherein said device-dependent parameters further comprise:

byte order; and, signed/unsigned format.

10. The system of claim 9, wherein said device-dependent parameters further comprise:

frame size;

frame rate; and, data type.

11. The system of claim 1, wherein said media framework comprises a Java Media Framework (JMF).

12. The system of claim 1, wherein said specific audio input and output devices are remotely positioned from the speech driven application in a computer communications network.

13. The system of claim 1, wherein the speech driven application is employed in an IVR system in a node in a computer communications network.

14. The system of claim 12, wherein said specific audio input and output devices are configured to place and receive telephone calls.

15. The system of claim 14, wherein said telephone calls are converted to digitized speech audio through a telephony interface to said computer communications network.

16. A method for linking a speech driven application to specific audio input and output devices comprising:

configuring an input buffer to receive digitized speech audio from a specific audio input device;

configuring an output buffer to transmit digitized speech audio to a specific audio output device;

providing device-independent methods for accessing said buffers; and, transporting digitized speech audio between the speech driven application and said specific audio input and output devices through said buffers via said device-independent methods, the speech driven application not specifying device-dependent parameters necessary to transport said digitized speech audio between said audio input and output sources.

17. The method of claim 16, wherein said step of configuring comprises:

selecting in said device-independent methods at least one method in a media framework for configuring said buffers according to device-dependent parameters necessary to transport said digitized speech audio between said specific audio input and output devices.

18. The method of claim 16, further comprising:

communicatively linking a speech recognition engine to said input buffer;

transporting said digitized speech audio from said specific audio input device to said speech recognition engine through said input buffer without specifying said device-dependent parameters;

converting said digitized speech audio to text in said speech recognition engine and providing said converted text to the speech driven application.

19. The method of claim 16, further comprising:

communicatively linking a text-to-speech (TTS) engine to said output buffer;

converting computer readable text in the speech driven application to said digitized speech audio in said TTS engine; and, transporting said digitized speech audio from said TTS engine to said specific audio output device through said output buffer without specifying said device-dependent parameters.

20. A machine readable storage, having stored thereon a computer program for transparently linking a speech driven application to specific audio input and output devices, said computer program having a plurality of code sections executable by a machine for causing the machine to perform the steps of:

configuring an input buffer to receive digitized speech audio from a specific audio input device;

configuring an output buffer to transmit digitized speech audio to a specific audio output device;

providing device-independent methods for accessing said buffers; and, transporting digitized speech audio between the speech driven application and said specific audio input and output devices through said buffers via said device-independent methods, the speech driven application not specifying device-dependent parameters necessary to transport said digitized speech audio between said audio input and output sources.

21. The machine readable storage of claim 20, wherein said step of configuring comprises:

selecting in said device-independent methods at least one method in a media framework for configuring said buffers according to device-dependent parameters necessary to transport said digitized speech audio between said specific audio input and output devices.

22. The machine readable storage of claim 20, further comprising:

communicatively linking a speech recognition engine to said input buffer;

transporting said digitized speech audio from said specific audio input device to said speech recognition engine through said input buffer without specifying said device-dependent parameters;

converting said digitized speech audio to text in said speech recognition engine and providing said converted text to the speech driven application.

23. The machine readable storage of claim 20, further comprising:

communicatively linking a text-to-speech (TTS) engine to said output buffer;

converting computer readable text in the speech driven application to said digitized speech audio in said TTS engine; and, transporting said digitized speech audio from said TTS engine to said specific audio output device through said output buffer without specifying said device-dependent parameters.

* * * * *